United States Patent [19]

Matsuoka et al.

[11] 4,344,778
[45] Aug. 17, 1982

[54] WATER PRODUCING APPARATUS

[75] Inventors: Hiromasa Matsuoka, Amagasaki; Kenkoku Azuma, Nagoya; Enju Nishiyama, Amagasaki, all of Japan

[73] Assignee: Mitsubishi Denki Kabushiki Kaisha, Tokyo, Japan

[21] Appl. No.: 147,126

[22] Filed: May 6, 1980

[30] Foreign Application Priority Data

May 15, 1979 [JP] Japan .................................. 54-59857
Feb. 12, 1980 [JP] Japan .................................. 55-16233

[51] Int. Cl.³ .............................................. B01D 53/04
[52] U.S. Cl. ........................................ 55/180; 55/198; 55/208; 55/387
[58] Field of Search ................................ 55/31–35, 55/179, 180, 198, 208, 387, 389

[56] References Cited

U.S. PATENT DOCUMENTS

| | | | |
|---|---|---|---|
| 2,138,689 | 11/1938 | Altenkirch | 55/33 X |
| 2,761,292 | 9/1956 | Coanda et al. | 55/208 X |
| 3,230,689 | 1/1966 | Hussmann | 55/31 X |
| 3,400,515 | 9/1968 | Ackerman | 55/179 |
| 3,527,024 | 9/1970 | McMinn et al. | 55/180 X |
| 4,146,372 | 3/1979 | Groth et al. | 55/33 |
| 4,185,969 | 1/1980 | Bulang | 55/31 |
| 4,219,341 | 8/1980 | Hussmann | 55/179 |

FOREIGN PATENT DOCUMENTS

| | | |
|---|---|---|
| 665060 | 9/1938 | Fed. Rep. of Germany . |
| 731471 | 2/1943 | Fed. Rep. of Germany . |
| 1245316 | 7/1967 | Fed. Rep. of Germany . |
| 2624392 | 11/1977 | Fed. Rep. of Germany . |
| 2702701 | 7/1978 | Fed. Rep. of Germany . |
| 2810269 | 9/1979 | Fed. Rep. of Germany ........ 55/179 |
| 817110 | 8/1937 | France . |
| 53-104573 | 9/1978 | Japan . |
| 2003049 | 3/1979 | United Kingdom . |

*Primary Examiner*—Robert H. Spitzer
*Attorney, Agent, or Firm*—Oblon, Fisher, Spivak, McClelland & Maier

[57] ABSTRACT

A water producing apparatus comprises means for adsorbing a moisture in the ambient air in an adsorbent for adsorption or absorption; means for desorbing the water as a steam by heating the adsorbent; means for evaporating a low quality water with a latent heat in the condensation of the desorbed steam; and means for condensing the steam obtained from the low quality water into the liquid water, whereby the water productivity is remarkably improved.

7 Claims, 11 Drawing Figures

FIG. 11

WATER PRODUCING APPARATUS

BACKGROUND OF THE INVENTION

1. Field of the Invention

The present invention relates to a water producing apparatus for producing liquid water from moisture in air.

2. Description of the Prior Arts

A water producing apparatus for producing a desalted water from sea water has been well-known as an apparatus for converting sea water into a desalted water. A water treating apparatus for treating a waste water such as a drainage in high degree to obtain water having high clarity has been proposed. This is one of the water producing apparatus classified in the apparatus for converting sea water into a desalted water. These apparatuses require a solution containing liquid water as a main component for producing water. Thus, these water producing apparatus could not be used to produce water in a place where no liquid water is found such as desert since the liquid water is used as the source.

It has been required to provide a water producing apparatus for producing water even in a place where no liquid water is found. Such novel water producing apparatus has been developed.

The novel water producing apparatus is an apparatus for producing water from a moisture in the air and is a novel water producing apparatus which can produce water in any place as far as the air is present. Of course, it is impossible to produce water if no moisture is present in the air. According to the statistical data for weather and the results of inventors' studies, even in the air in a large desert such as the central part of the Arabian desert, 3 to 4 g. of water is included in 1 m$^3$ of the air, and accordingly, water can be produced. Thus, water can be obtained in a sterile land to live and to work and water can be used for irrigation to culture plants. The water producing apparatus contributes to expand living zones for human-being and is quite important.

The principle of the water producing apparatus is to produce water by adsorbing moisture in the air in an adsorbent as the first step and then, desorbing water adsorbed as steam by heating the water-logged adsorbent and condensing the steam in a condenser as the second step. The adsorbent is dehydrated to regenerate the adsorbing function whereby the adsorbent can be repeatedly used for adsorbing moisture in air. Thus, liquid water can be repeatedly obtained from air.

Figure 1:
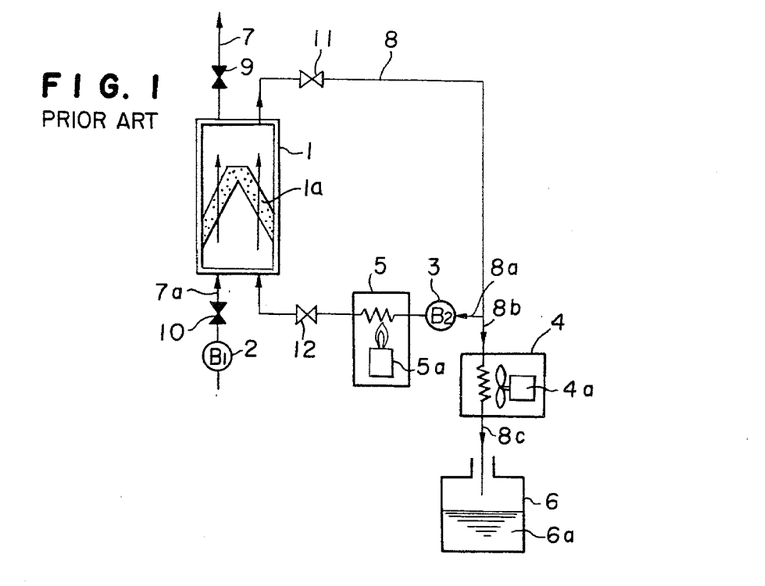
FIG. 1 is a diagram for showing the principle of the water-producing apparatus in the prior invention.

FIG. 1 is a diagram for showing the principle of the apparatus for producing liquid water from moisture in the air by using an adsorbent.

In FIG. 1, the reference numeral (1) designates a column for holding an adsorbent (1a); (2) and (3) respectively designate blowers; (4) designate a condenser for condensing a hot air having high humidity desorbed from the column (1) in the desorbing step; (4a) designates an air cooling fan; (5) designates a heater for heating the air fed through the blower (3), by a burner (5a); (6) designates an air-open type water receiver which stores water obtained by the condensation; (6a) designates water produced; (7) designates a discharge passage for discharging dried air fed from the column (1) after adsorbing moisture in the adsorbing step as the first step; (7a) designates a sucking passage for feeding the air into the column (1); (8) designates a passage for feeding steam desorbed from the column (1) in the desorbing step; (8a) designates a passage for recycling, to the column (1), the gas (steam) for the desorption by the blower (3) while heating it by the heater; (8b) designates a passage for feeding the steam for an increased volume of the steam desorbed by the column (1) into the condenser (4); (8c) designates a passage for discharging the liquid water condensed by the condenser (4) into the water receiver (6); (9), (10), (11) and (12) respectively are valves for opening and closing the passages which are placed in the passages for feeding the air, the dried air and the hot air having high humidity.

The operation of the present invention will be illustrated.

As the adsorbing step (the first step) for adsorbing moisture in the air on the adsorbent (1a) held in the column (1), the valve (9) and the valve (10) are opened and the blower (2) is driven to feed the air into the column (1). The moisture in the air is adsorbed on the adsorbent (1a) and the dried air is discharged from the column (1) through the valve (9). When the adsorbent (1a) adsorbs enough moisture, the adsorbing step is finished. Then, the desorbing step for desorbing water adsorbed on the adsorbent (1a) is carried out. The valves (9) and (10) are closed and then the valves (11) and (12) are opened.

In the desorbing step, the blower (3), the heater (5) and the condenser (4) are mainly used. That is, the gas in the column (1) and the recycling passage (8), (8a) is recycled by the blower (4). The gas is heated by the heater (5). The hot gas (about 300° C. in the case of silica gel as the adsorbent) is fed into the column (1) whereby the adsorbent (1a) is heated to desorb the adsorbed water as steam. The temperature of the hot air fed from the heater (5) is decreased by the latent heat for desorption. When silica gel is used as the adsorbent (1a), it is preferable to be about 200° C. be the temperature of hot air having high humidity discharged from the column (1). The temperature depends upon the desorption of the adsorbed water.

The gas recycled by the blower (3) is air remained in the column (1) at the initiation of the desorbing step. During the desorption, the air is replaced by the steam formed by the desorption and only the steam is substantially remained for a short time. The steam corresponding to the desorbed steam formed by the desorption is discharged through the passage (8b) into the condenser (4) and is condensed into the liquid water in the condenser and is fed through the passage (8c) into the water receiver (6). The end of the passage (8c) is opened through the water receiver (6) and accordingly, the pressure for the recycling gas for the desorption is substantially the atmospheric pressure (slightly higher than the atmospheric pressure for the pressure loss in the condenser (4). The temperature of the recycling gas (steam) for the desorption is about 200° to 300° C. and accordingly, the steam is super heated steam. The heat for the adsorbent (1a) in the column (1) is given by the non-latent heat of the steam. The recycling steam is not condensed into a liquid water by transferring the heat to the adsorbent (1a). The desorbing step is continued until completing the desorption of the water from the adsorbent (1a). After completing the desorbing step, the blower (3), the heater (5) and the condenser (4) are stopped and the valves (11), (12) are closed and then, the adsorbing step is carried out. The adsorbing step and the desorbing step are repeated to obtain the liquid water in the water receiver (6).

In the case of the water producing apparatus. There is a question whether the water adsorbed in the adsorbent can be fully desorbed as steam by the steam. However, this is not a problem. The desorption is performed by the high temperature and it is balanced to the partial pressure of the steam around the adsorbent. The partial pressure of the steam is about 1 atm. (the atmospheric pressure) and does not exceed the limit. Therefore, the temperature of the adsorbent can be high enough to balance to 1 atm. When the temperature of the adsorbent is 300° to 200° C., the water can be desorbed to remain only 3 to 4 wt.% of water even though the partial pressure of the steam is 1 atm. In the adsorbing step, the water is usually adsorbed for 10 to 20 wt.% based on the silica gel depending upon the condition of a humidity and a temperature. On the other hand, the adsorbent can be heated by any hot gas. In this case, the steam is used for heating the adsorbent.

In the apparatus in the prior invention, in order to condense the desorbed steam into the liquid water, the condenser has been cooled by the air cooling, and accordingly, the latent heat in the condensation of the steam is lost in the atmosphere. Nevertheless, the energy for driving the blower for the air cooling is required. This is a serious problem from the viewpoint of the saving of energy.

Therefore, a water producing apparatus for producing the liquid water with a smaller energy without energy loss.

SUMMARY OF THE INVENTION

It is an object of the present invention to overcome the disadvantage and to provide a water producing apparatus having a water productivity efficiency of about two times or more that of the conventional apparatus, which uses a low quality water such as a salted water or a drainage as far as any liquid water is obtained, thereby evaporating the low quality water to cool the condenser and to recover steam as a high quality water.

In accordance with the water producing apparatus of the present invention, the moisture in the gas is adsorbed in an adsorbent (this means an absorbent or adsorbent) and the water is desorbed as steam by heating the wet adsorbent and the steam is condensed by cooling it to obtain the liquid water and a low quality water is evaporated by the latent heat of the desorbed steam in the condensation and liquid water is also produced from the evaporated steam by a condensation.

In order to evaporate the low quality water by the latent heat of the desorbed steam in the condensation, a condenser-evaporator can be used for condensing the desorbed steam by the cooling by the evaporation of the low quality water; or a first condenser-evaporator is used for condensing the desorbed steam by the cooling by the evaporation of the low quality water to form steam from the low quality water and a second condenser-evaporator which connected in series to condense the steam formed by the first condenser-evaporator by the cooling by the evaporation of the low quality water to form steam from the low quality water can be used; or a multi-stage flush evaporator for evaporating a low quality water with the latent heat of the desorbed steam as a heat source can be used.

A plurality of the second condenser-evaporators which are connected in series can be used as said second condenser-evaporator.

It is preferable to have a structure wherein the desorbed steam is fed into a steam compression type distiller to heat-exchange it with the low quality water kept in the distiller thereby condensing the steam into liquid water and distilling the low quality water to obtain the high quality water by the distiller. It is further preferable to comprises a first heat-exchanger for heat-exchanging the distilled steam obtained from the steam compression type distiller with the low quality water kept in the distiller; and a second heat-exchanger for heat-exchanging the steam desorbed from the adsorbent with the low quality water.

In accordance with the water producing apparatus of the present invention, the liquid water is obtained from the moisture in the ambient air and the low quality water is evaporated by the latent heat in the condensation so as to obtain also the liquid water from the steam by the condensation whereby the latent heat in the condensation (which has been lost in the atmosphere) can be effectively utilized. Therefore, several times of water productivity can be attained in comparison with the conventional devices.

DETAILED DESCRIPTION OF THE PREFERRED EMBODIMENTS

Figure 2:
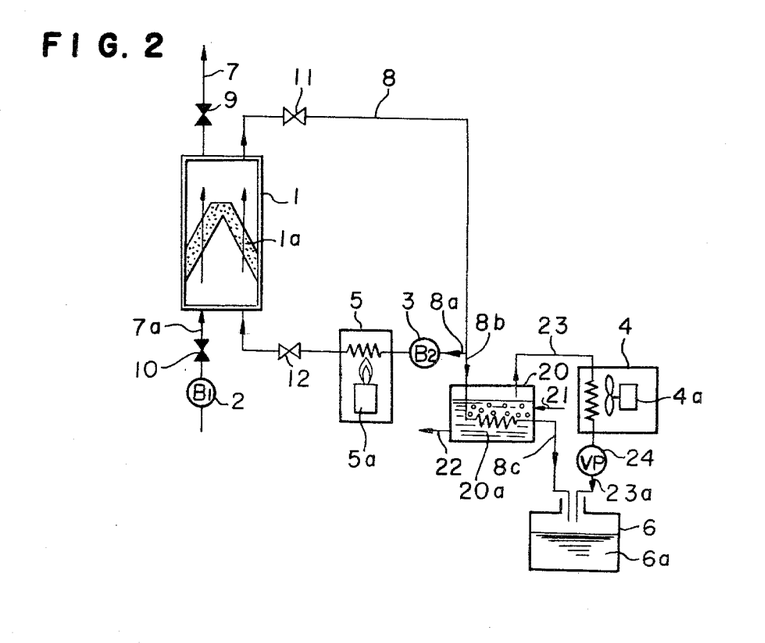
FIG. 2 is a diagram of one embodiment of the water-producing apparatus of the present invention.

FIG. 2 is a diagram of the first embodiment of the present invention wherein the same references designate identical or corresponding parts of FIG. 1 and accordingly, the description is not repeated.

The reference numeral (20) designates a condenser-evaporator which condenses the desorbed steam obtained in the desorbing step by cooling it with a low quality water whereas the low quality water is evaporated; (20a) designates the low quality water fed into the condenser-evaporator (20) so as to cool the desorbed steam and to be evaporated itself (hereinafter referring to as cooling under evaporation); (21) designates an inlet of the low quality water; (22) designates an outlet of the low quality water (20a) when it is concentrated in the condenser-evaporator (20) to be high impurity concentration; (23) designates a passage for feeding steam formed in the condenser-evaporator (20) into the condenser (4); (24) designates a suction pump for reducing the pressure in the condenser-evaporator (20) and feeding the water condensed by the condenser (4) into the water receiver (6); (23a) designates a passage for feeding the water from the suction pump (24) into the water receiver (6). The suction pump (24) should suck the gas with water and is preferably a water shield pump.

In this embodiment, the adsorbing step and the desorbing step are alternately repeated and the steam formed in the desorbing step is discharged through the passage (8b) is the same as that of the conventional principle shown in FIG. 1. The steam is cooled in the condenser-evaporator (20) by the latent heat in the evaporation of the low quality water (20a). The steam in the passage (8a) is 100% steam under 1 atm. When the temperature of the condenser-evaporator (20) is maintained at lower than 100° C., the substantial steam fed through the passage (8b) is condensed into the liquid water.

The pressure in the condenser-evaporator (20) is reduced to lower than 1 atm. under sucking by the suction pump (24) whereby the low quality water (20a) is evaporated at lower than 100° C. and the latent heat in the condensation of steam is absorbed as the latent heat in the evaporation. The latent heat in the evaporation is substantially the same as the latent heat in the condensation of steam. If the low quality water (20a) contains hygroscopic materials and the content of the hygroscopic materials is remarkably high, both latent heats may be different. It is rare to use such low quality water. Therefore, as a principle, the quantity of water condensed is substantially equal to that of water evaporated in the condenser-evaporator (20). In practice, the quantity of water evaporated is 10 to 20% less than the quantity of water condensed because of heat losses such as the heat radiation from the outer wall of the condenser-evaporator (20) the heat for heating the low quality water (20a) fed from the inlet (20) to the evaporation temperature; and the heat lost by the condensed water discharged from the outlet (22).

The steam evaporated by the condenser-evaporator (20) is fed through the passage (23) into the air-cooling type condenser to be condensed into the liquid water and the liquid water is fed through the passage (23a) into the water receiver (6) by the suction pump (24).

The apparatus in this embodiment produces high quality water at a ratio of about two times of the quantity of water obtained by the conventional apparatus shown in FIG. 1, though only the condenser-evaporator (20) and the suction pump (24) are additionally equipped. The cost for the equipment is slightly higher, but it is less than two times. With regard to the operation cost, the energy for the suction pump (24) and certain energy for feeding the low quality water and discharging the condensed water (not shown) are required. This energy is only 10 to 20% in comparison with the total energy for the water producing apparatus (mainly the heat energy of the heater (5) for desorbing water and the energy of the blower (2) for feeding air in the adsorbing step). In accordance with the embodiment, therefore, the cost for producing a unit quantity of water can be remarkably reduced than that of the conventional apparatus shown in FIG. 1 for both the equipment cost and the operation cost.

The relation of the temperature and the pressure in the condenser-evaporator (20) will be illustrated in detail.

Figure 3:
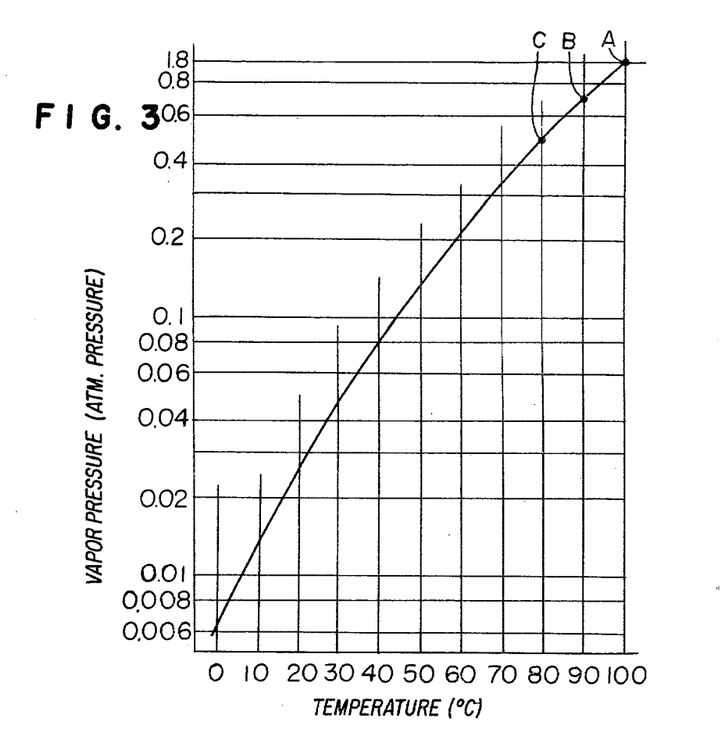
FIG. 3 is a graph showing the relation of the temperature and the vapor pressure of water.

FIG. 3 is a graph showing the relation of the temperature and the vapor pressure of water. In FIG. 3, the point A designates the vapor pressure of water at 100° C. which is 1 atm.; the point B designates the vapor pressure of water at 90° C. which is about 0.7 atm. When the inner pressure of the condenser-evaporator (20) is kept in 0.7 atm. by the suction pump, the temperature of the low quality water (20a) is maintained at about 90° C. The steam at 1 atm. fed through the passage (8b) into the condenser-evaporator (20) is cooled to about 90° C. (slightly higher because of heat resistance of the heat conductive parts) whereby steam is condensed into the liquid water. The vapor pressure of steam at 90° C. is 0.7 atm. When the steam under 0.7 atm. is fed, it is not true to condense only steam for about 0.3 atm. but it is true to condense all of the steam fed into it when the steam is 100% and the temperature is lower than the steam condensing temperature at 100° C. and the latent heat at the temperature (600 k. cal/kg. water at 0° C. and 540 k. cal/kg. water at 100° C.) is radiated. In this embodiment, said condition is satisfactorily given and accordingly, all of steam fed through the passage (8b) into the condenser-evaporator (20) is condensed into the liquid water. In order to satisfy said condition, the temperature of the low quality water (20a) can be higher as a principle, however, about 90° C. is the optimum temperature in view of the heat resistance of the heat conductive parts in the practice.

In the embodiment shown in FIG. 2, the low quality water (20a) in the condenser-evaporator (20) is evaporated as steam at about 90° C. under a pressure of about 0.7 atm. and is fed through the passage (23) into the air cooling type condenser (4) to be condensed into the liquid water. The latent heat of the steam at about 90° C. under 0.7 atm. can be used for evaporating the other water.

Figure 4:
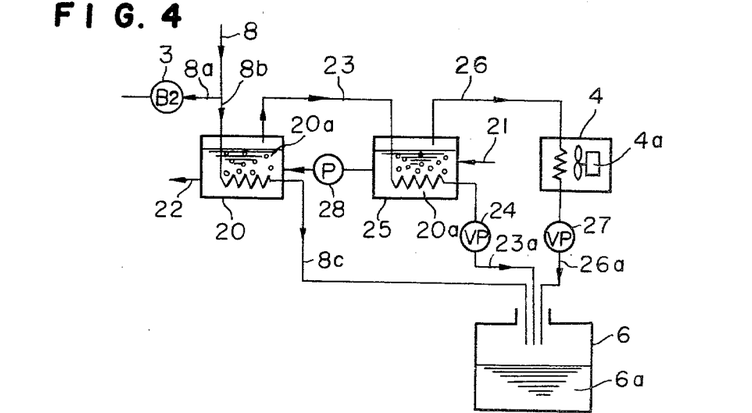
FIG. 4 is a diagram of the important part in a second embodiment of the present invention.

FIG. 4 is a diagram of the important part of the second embodiment of the present invention in said consideration.

In FIG. 4, the reference numeral (25) designates a second condenser-evaporator for evaporating a low quality water (20a) fed from the inlet (21) by utilizing the latent heat of steam obtained from the first condenser-evaporator (20) through the passage (23); (26) designates a passage for feeding steam formed by the second condenser-evaporator (25) into the air cooling type condenser (4); (27) designates a suction pump which reduces the pressure in the second condenser-evaporator (25) and feeds the water condensed by the condenser (4) through the passage (26a) into the water receiver (6); (28) designates a pump for feeding the low quality water (20a) in the second condenser-evaporator (25) into the first condenser-evaporator (20).

In this embodiment, the suction pump performs to reduce the pressure in the first condenser-evaporator (20) and to feed out the water condensed by the second condenser-evaporator (25) through the passage (23a) into the water receiver (6). The low quality water (20a) fed through the inlet (21) is heated in the second condenser-evaporator (25) and then, it is fed into the first condenser-evaporator (20) whereby the heat efficiency is improved.

The operation of the second embodiment may be easily understood from the description of the operation of the first embodiment. The detailed description is not repeated. Only the relation of the temperature and the pressure will be illustrated.

As the operation of the first embodiment shown in FIG. 2, the temperature of the first condenser-evaporator (25) is 90° C. The pressure in the second condenser-evaporator (25) is reduced to 0.47 atm. by the suction pump (27). The temperature of the low quality water (20a) in the second one is 80° C. to evaporate it (C point in FIG. 3). Thus, the air cooling condenser (4) performs to condense steam under 0.47 atm. In the second embodiment, the high quality water can be obtained at a ratio of three times that of the conventional apparatus shown in FIG. 1.

Much water can be obtained by increasing stages of the condenser-evaporators in the same manner. The limitation of the stages is depending upon the temperature of the air cooling type condenser (4).

In the second embodiment, the steam at 80° C. should be cooled to about 70° C. for condensing steam. If the steam is cooled to 60° C. by increasing the heat transferring area and increasing a volume of air, the other stage of the condenser-evaporator can be added. Thus, when the temperature of air used for air-cooling is about 30° C., the temperature of the condenser can not be lower than 30° C. even though the heat transferring area and the air volume are increased. When it can be cooled to 40° C. by increasing the heat transferring area and the air volume are increased, the two other stages of the condenser-evaporators can be increased in a temperature difference is 10° C. for each stages.

When such multi-stage condenser-evaporators are required, it is preferable to substitute them by a multi-stage flush evaporators.

Figure 5:
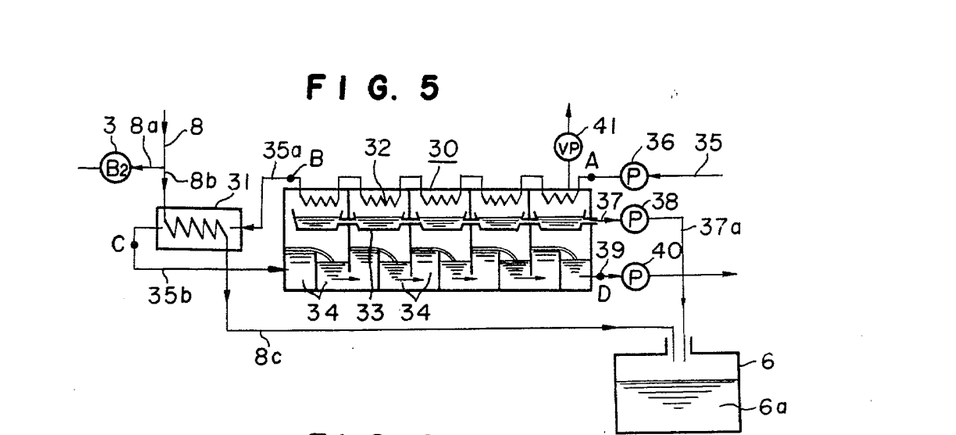
FIG. 5 is a diagram of the important part in a third embodiment of the present invention using a multi-stage flush evaporator.

FIG. 5 is a diagram of the important part of the third embodiment of the present invention using the multi-stage flush evaporators.

In FIG. 5, the reference numeral (30) designates a multi-stage flush evaporator; (31) designates a condenser-heater for heating water in the multi-stage flush evaporator (30) with the steam formed in the desorbing step of the water producing apparatus; (32) designates a condensing part for condensing the steam evaporated by the multi-stage flush evaporator (30); (33) designates a plate receiver for receiving the water condensed; (34) designates a flush evaporation part; (35) designates a passage for sucking the low quality water; (35a) designates a passage for feeding the low quality water heated by the condensing part (32) of the multi-stage evaporator (30) into the condenser-heater (31); (35b) designates a passage for feeding the low quality water heated by the condenser-heater (31) into the flush evaporating part (34) of the multi-stage flush evaporator (30); (36) designates a pump for feeding the low quality water; (37) designates an outlet of water dropped into the plate receiver (33); (38) designates a pump for feeding the water through the passage (37a) into the water receiver (6); (39) designates an outlet of the low quality water condensed by the multi-stage flush evaporator (30); (40) designates a pump for discharging the waste water; (41) designates a suction pump (referring to as extraction pump) equipped with the multi-stage flush evaporator (30). The desorbed water condensed by the condenser-heater (31) is fed through the passage (8c) to the water receiver (6).

The multi-stage flush evaporator (30) is known as used in a sea water desalting apparatus. Therefore, the operation is not repeated.

In accordance with the embodiment, the adsorbing-desorbing parts for adsorbing the moisture from the ambient air and desorbing the water is connected through the condenser-heater (31) to the multi-stage flush evaporator (30) whereby the steam formed in the desorbing step is used as the heat source of the multi-stage flush evaporator (30). Therefore, the relation of temperatures in the condenser-heater (31) and the multi-stage flush evaporator (30) is quite important.

Figure 6:
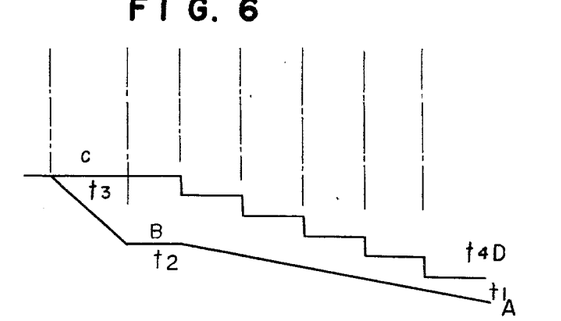
FIG. 6 is a graph for showing the relation of the temperatures at the various positions in the third embodiment.

FIG. 6 is a graph showing the temperatures at various positions shown in FIG. 5. The point A corresponds to the inlet of the low quality water; the point B corresponds to the inlet passage (35a) for feeding the heated low quality water into the condenser-heater (31); the point C corresponds to the passage (35b) for feeding the low quality water heated by the condenser-heater (31) into the multi-stage evaporator (30); and the point D corresponds to the outlet (39) of the concentrated low quality water concentrated by the multi-stage flush evaporator (30).

At the point A, the low quality water having a temperature $t_1$ fed as a coolant into the condensing part (32) of the multi-stage flush evaporator (30) is heated by the condensing part (32). At the point B, it is heated to a temperature $t_2$ and is fed into the condenser-heater (31) to heat it at a temperature $t_3$. At the point C, it is fed through the passage (35b) into the flush evaporating part (34) of the multi-stage flush evaporator (30). The water at the temperature $t_3$ is evaporated during passing through the stages of the flush evaporating part (34) and the temperatures are stepwise lowered by the stages to reach a temperature $t_4$ at the point D and the water is discharged by the pump (4).

The pressure of the desorbed steam fed into the condenser-heater (31) is 1 atm. and accordingly, the temperature $t_3$ can be 100° C. as a principle. In the practice, it is about 90° C. with the temperature difference of about 10° C. because of the heat conductive resistance etc. The multi-stage flush evaporator can be operated even at about 60° C. for a purpose of utilizing wasted heat. Therefore, it can be satisfactorily operated at 90° C. in this embodiment. The steam evaporated by the flush evaporating part (34) is condensed by the condensing part (32) and water is fed through the plate receiver (33) and the passage (37), and further fed by the pump (38) through the passage (37a) into the water receiver (6). Therefore, high water productivity is attained.

In the above embodiment, only one column for the adsorbent is used. In order to continuously feed the desorbed steam, it is possible to provide a plurality of columns are used to alternately or sequentially operate them in the water producing apparatus.

In said embodiment, said grain adsorbent is considered to use for adsorbing water. It has been also known to use a liquid adsorbent such aqueous solutions of lithium chloride (LiCl), lithium bromide (LiBr), ethyleneglycol or glycerine. The liquid adsorbent can be used for absorbing the moisture in the ambient air.

Figure 7:
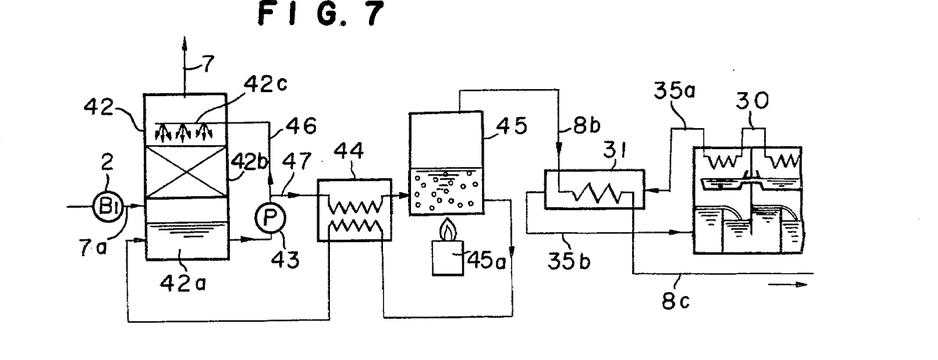
FIG. 7 is a diagram of the important part in a fourth embodiment using a liquid absorbent for water.

FIG. 7 is a diagram of the important part of the fourth embodiment of the present invention using the liquid adsorbent. The same references designate identical or corresponding parts of the above-mentioned embodiments. The description of the parts is not repeated.

In FIG. 7, the reference numeral (42) designates a water adsorbing part; (42a) designates a liquid adsorbent; (42b) designates a packing such as Raschig's rings which is packed above the air inlet of the water adsorbing part (42) to pass air to the air outlet; (42c) designates a nozzle for spraying the adsorbent; (43) designates a pump for recycling the adsorbent; (44) designates a heat-exchanger; (45) designates a steam desorbing part;

(45a) designates a burner for heating; (46) designates a water adsorption recycling passage for the adsorbent; (47) designates a water desorption recycling passage.

A part of the adsorbent recycled by the pump (43) is passed through the water adsorption recycling passage (46) and is sprayed through the nozzle (42c) on the packing (42b) to wet the surface of the packing. The area of the adsorbent for contacting with air is increased to absorb the moisture from the ambient air and is returned to the bottom of the absorbing part (42). The diluted adsorbent discharged by the pump (43) is fed into the water desorption recycling passage (47) and is fed through the heat-exchanger (44) to the water desorbing part (45) and is heated by the burner (45a). The absorbed water is desorbed as steam. The desorbed steam is fed through the passage (8b) into the condenser-heater (31) for supplying heat to the multi-stage flush evaporator (30). On the other hand, the adsorbent concentrated by the water desorbing part (45) is heat-exchanged by the heat-exchanger (44) with the diluted adsorbent fed through the absorbing part (42) to the desorbing part (45) and is cooled and recycled into the absorbing part (42). The desorbed steam is condensed into liquid water by the condenser-heater (31) and the water is fed through the passage (8c). The latent heat in the condensation is utilized for the evaporation of the low quality water to form steam in the multi-stage flush evaporator (30). The high quality water is obtained by it. High water productivity efficiency is attained.

The other embodiment of the water producing apparatus having an improved operation efficiency will be illustrated. In the embodiment, the desorbed steam is fed into a steam compression type distiller to condense the steam into the liquid water by transferring the latent heat in the condensation to the evaporator whereas the heat loss of the steam compression type distiller is compensated by the latent heat so as to distill the low quality water in the steam compression type distiller to recover the high quality water.

Figure 8:
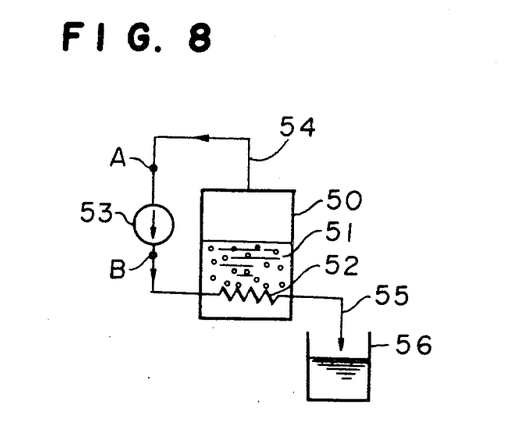
FIG. 8 is a diagram of a conventional steam compression type distiller used for the apparatus of the invention.

FIG. 8 is a diagram of the conventional steam compression type distiller wherein the reference numeral (50) designate an evaporator; (51) designates a low quality water contained in the evaporator (50); (52) designates a heat-exchanger; (53) designates a compressor; (54) designates a pipe for feeding the steam from the evaporator (50) into the compressor (53); (55) designates a pipe for discharging water formed by condensing steam by the heat-exchanger (52); and (56) designates a water receiver for the high quality water obtained by the steam compression type distiller.

The point A and the point B in FIG. 8 are the positions for feeding steam so as to compensate heat loss caused in the distiller. In usual, the steam is fed to the point B in the case of enough steam pressure but is fed to the point A in the case of shortage of the steam pressure.

The operation of the distiller will be described.

The compressor (53) has a function for feeding a gas to the arrow line direction and accordingly, the gas (steam) in the upper part of the evaporator (50) is sucked under a reduced pressure to be fed into the heat-exchanger (52). In usual, the pressure loss in the heat-exchanger (52) is small and the heat-exchanger (52) is opened through the outlet pipe (55) to the atmosphere. The pressure of the steam fed from the compressor (53) to the heat-exchanger (52) is substantially the atmospheric pressure (1 atm.). When the temperature of the low quality water (51) in the evaporator (50) is lower than 100° C., the steam is condensed into the liquid water during passing through the heat-exchanger (52). The latent heat in the condensation is transferred to the low quality water (51). The pressure in the evaporator (50) is reduced (lower than 1 atm.) under the suction by the compressor (53) and accordingly, the low quality water (51) is evaporated at lower than 100° C. The steam formed by the evaporation is fed by the compressor (52) into the heat-exchanger (52) and is condensed into the high quality water and the latent heat is transferred to the low quality water to evaporate it.

In a case of no-heat loss, the distillation can be continued only by supplying a small mechanical energy to the compressor (53) as a principle. In the practice, certain heat loss is found, and the quantity of steam evaporated is gradually decreased to stop the evaporation. In order to compensate the heat loss, the steam is fed from the point A or the point B. This is the principle of the steam compression type distiller.

The quantity of the steam for the compensation of the heat loss is only one several to one several tens of the distilled quantity of the steam. Therefore, if all of the desorbed steam obtained in the conventional water producing apparatus is fed for the compensation of the heat loss of the steam compression type distiller, the distilled water at a ratio of several times to several tens times can be obtained. This is the principle of the present invention.

Figure 9:
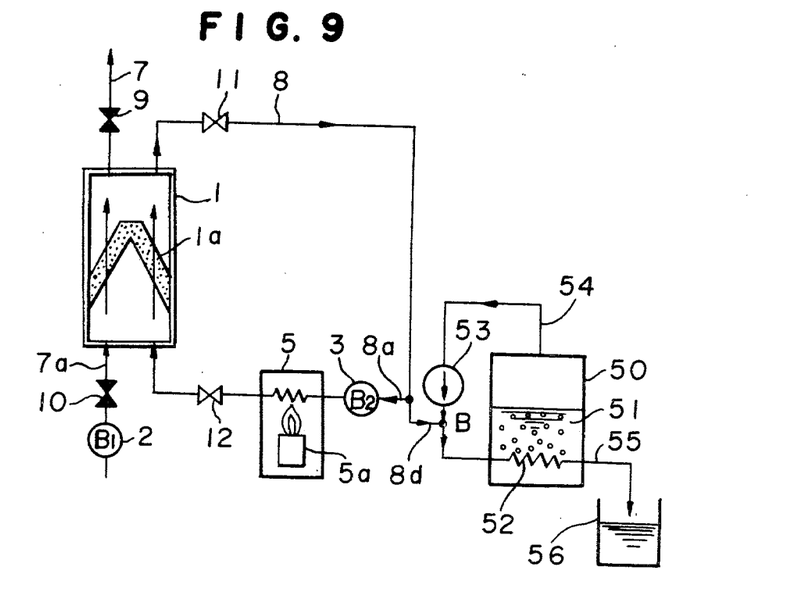
FIGS. 9, 10 and 11 are respectively diagrams of fifth, sixth and seventh embodiments using the steam compression type distiller.

FIG. 9 is a diagram of the fifth embodiment of the present invention. The same reference numerals designate identical or corresponding parts in the embodiments shown in FIGS. 1 and 8. The description of the parts is not repeated.

Instead of feeding the steam desorbed from the adsorbent (1a) in the column (1) into the condenser (4), the desorbed steam is fed through the passage (8d) into the steam compression type distiller as shown in FIG. 8. The pressure of the desorbed steam is slightly higher than the atmospheric pressure. In the fifth embodiment, the steam is fed to the point B in FIG. 9.

Figure 10:
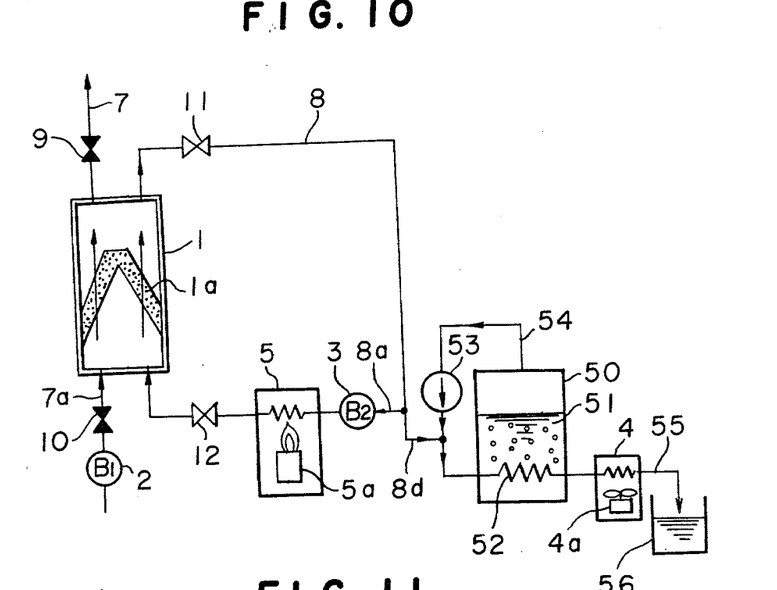

FIG. 10 is a diagram of the sixth embodiment of the present invention. In this embodiment, the condenser (4) is connected to the outlet pipe (55) connected to the heat-exchanger (52) of the steam compression type distiller together with the fifth embodiment shown in FIG. 9.

When excess desorbed steam over that of the heat loss of the steam compression type distiller is fed, the steam is not completely condensed by the heat-exchanger (52) and a part of the steam is discharged through the outlet pipe (55) into the atmosphere to cause the steam loss. In the sixth embodiment, the air cooling condenser (4) is connected to condense the uncondensed steam.

Figure 11:
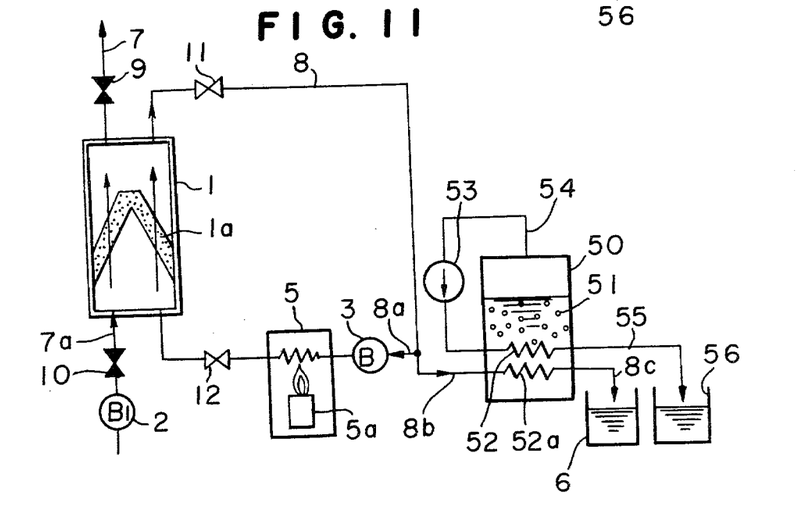

FIG. 11 is a diagram of the seventh embodiment of the present invention.

In the fifth embodiment, the water obtained from the moisture in the ambient air and the water distilled by the low quality water (51) by the steam compression type distiller are obtained as a mixture.

In the seventh embodiment, the desorbed steam for compensation of the heat-loss of the steam compression distiller is fed to an independent heat-exchanger (52a) separated from the heat-exchanger (52) used in the fifth and sixth embodiments are the condensed water is fed through the pipe (8c) to the water receiver (6).

When a wasted water is used as the low quality water (51), it is not feel easy to drink the water obtained from the wasted water even though it is produced by the distillation. In such case, the water in the water receiver (6) is used for drinking and the water in the water receiver (56) can be used for the other purpose.

The above-mentioned embodiments are described for the purpose of illustration of the present invention and can be modified in the scope of the present invention.

What is claimed as new and desired to be secured by Letters Patent of the United States is:

1. A water producing apparatus comprising:
   an adsorbent in a confined space;
   means communicating with said confined space for contacting said adsorbent with ambient air whereby moisture in said ambient air is adsorbed;
   means communicating with said confined space for heating said adsorbent to desorb the moisture adsorbed thereon as steam;
   first means communicating with said confined space for condensing said steam;
   means, associated with said means for condensing said steam, for evaporating liquid low quality water, whereby the latent heat of condensation of said condensating steam evaporates said liquid low quality water; and
   second means, communicating with said means for evaporating, for condensing said evaporated low quality water into liquid water.

2. The apparatus of claim 1 wherein said first means for condensing and said means for evaporating comprise a single condenser-evaporator including heat exchanger means adapted to heat exchange said liquid low quality water with condensing steam to heat and evaporate said liquid low quality water.

3. The apparatus of claim 1 wherein said first means for condensing and said means for evaporating comprise:
   a first condenser-evaporator including first heat exchange means adapted to heat exchange a first portion of said liquid low quality water with condensing steam to heat and evaporate said first portion of said liquid low quality water; and
   at least one second condenser-evaporator, communicating with said evaporated low quality water, and including second heat exchange means adapted to heat exchange at least one second portion of said liquid low quality water with condensing evaporated low quality water to heat and evaporate said at least one second portion of said liquid low quality water.

4. The apparatus of claim 3 wherein said at least one second condenser-evaporator comprises at least two second condenser-evaporators connected in series.

5. The apparatus of claim 1 wherein said means for evaporating and said second means for condensing comprise a multi-stage flush evaporator including heat exchange means adapted to heat exchange said liquid low quality water at high temperature with said liquid low quality water at low temperature.

6. The apparatus of claim 1 wherein said first and second means for condensing and said means for evaporating comprise a steam compression type distiller including heat exchanger means adapted to heat exchange both said steam and said evaporated low quality water with said liquid low quality water.

7. The apparatus of claim 6 wherein said heat exchanger means comprises:
   a first heat exchanger adapted to heat exchange said steam with said liquid low quality water; and
   a second heat exchanger adapted to heat exchange said evaporated low quality water with said liquid low quality water.

* * * * *